Patented June 29, 1937

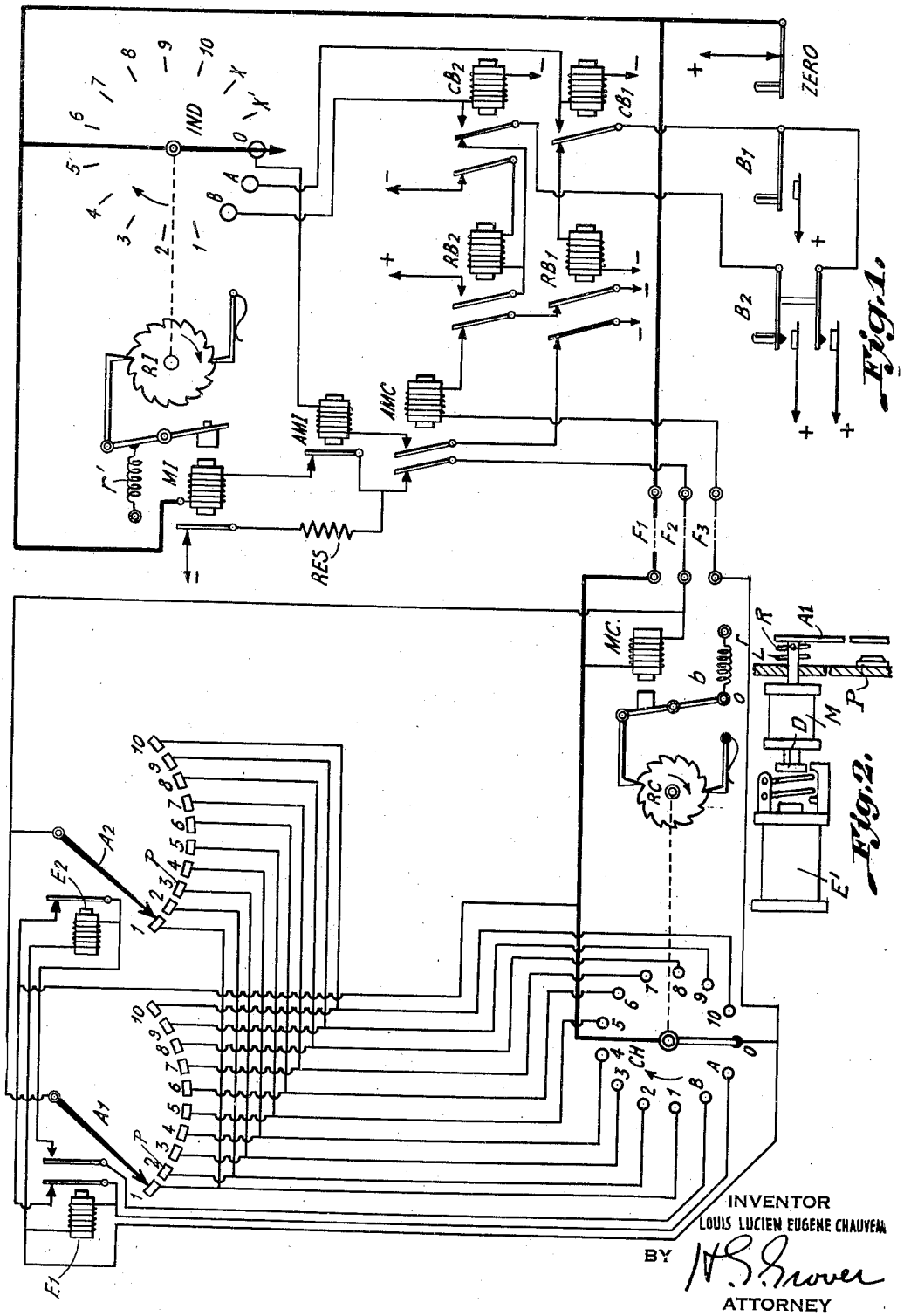

2,085,415

UNITED STATES PATENT OFFICE 2,085,415

TELEMETRIC REPEATING INDICATOR

Louis Lucien Eugène Chauveau, Paris, France, assignor to Compagnie Generale de Telegraphie sans Fil, a corporation of France Application July 26, 1933, Serial No. 682,207
In France August 1, 1932

8 Claims. (Cl. 177—351)

The invention relates to a system of electro-mechanical elements which are designed to insure repetition at a distance of indications or readings as given by the pointers of measuring instruments.

In such a system of measuring instruments it is often necessary to insure a repetition from a distant point either for the reason that the measuring instruments are mounted at inaccessible places for example, a remotely submerged location or a position wherein the readings of measuring instruments which are located at different points can be centralized or collectively located at a single supervision or control place.

The system forming the object of this invention comprises first an assembly of elements placed in the neighborhood of measuring devices whose indications or readings are to be transmitted to a remote point, and, second, an assembly of suitable means which are mounted at the point where such indications or readings are to be repeated, the assembly or equipment first referred to being the transmitter and the second outfit the receiver. These two assemblies are inter-connected by means of three wires or better by two metal wires and the ground.

The following description by reference to the accompanying drawing covers one exemplified embodiment of the basic idea of the invention wherein Fig. 1 is a circuit diagram and Fig. 2 is a detail of a magnetic control device.

At the sending or transmitting end, the measuring instruments whose readings are to be repeated at a distant point, are represented by their indicator hands or needles at A1 and A2. As shown by Figure 2, needle A1 is secured on a spindle L which carries also the moving coil M or the electrical movement of the apparatus and a disc D which is attracted by the relay E1 when energized. Shaft L is then shifted longitudinally across the spring R and the needle A1 comes to make contact with the contact P. Each one of these needles is displaced under action of the measuring instrument mechanism opposite a bank of contacts without engaging with these latter.

A coupling electromagnet E1 and E2 is associated with each index hand, respectively; which is energized at the time of telemetric readings and causes the application or engagement of the pointer upon the contact stud that happens to face it.

A finder CH comprises a brush which is shifted opposite a bank of contacts, these being separately associated with corresponding contacts of the index hands. The shifting of the finder brush is occasioned by an electro-mechanical mechanism comprising relay MC which, by means of a pawl and ratchet system causes the driving of ratchet wheel RC being integral with the brush. The brush CH thus is able to find a contact stud on which the index hand or pointer engages.

At the receiving end there is located an electro-mechanical device which comprises the relay MI and, by the aid of a pawl and ratchet system drives ratchet wheel RI arranged integral with the pointer of indicator IND.

A relay AMI allows the arresting the relay device MI. A second relay AMC is adapted to stop the relay device MC. A contact switch or button B1 is combined with relays RB1 and CB1 causes operation of the system for telemetric reading of indications of the first measuring instrument A1. A second button B2 combined with relays RB2 and CB2 causes operation of the system for telemetric readings of indications of the second measuring instrument A2.

A zero button allows restoring to zero position of the complete assembly after a reading has been taken.

All of these elements are inter-connected by depressing one of the buttons B1 or B2 whereupon the pointer of the measuring device corresponding thereto will be caused to engage the contact that happens to face it, the brush of seeker CH and the pointer of indicator IND will be shifted together by moving an equal number of steps and become arrested when a brush of the seeker encounters a contact corresponding to the one with which pointer of the measuring instrument has come to be engaged. The index hand of device IND thus reproduces an indication given by the measuring device. This reading will remain registered until a change is made by depressing the zero button, all of the elements are then restored to their initial position.

The operations of the various elements will be better understood by the following description; however, in considering the operation it should be kept in mind that the relays are represented in the accompanying drawing at rest (inoperative state) and not energized. The points marked + and − are respectively connected together with terminals of a direct current source. Moreover, all of the elements are shown in their starting positions.

It will be noted that the ratchet wheel RC is furnished with 13 teeth, while the ratchet wheel RI has 15 teeth, or two more than the first named ratchet wheel which is one of the characteristic features of the present system.

Suppose that it is desired to repeat in the device IND a reading of pointer AI, the apparatus being fed or energized, there is depressed button BI, relay RBI is then rendered operative thus deenergizing relays AMC and AMI which stay stationary.

The electromagnets MI and MC which are paralleled are then energized since they are joined with + by way of the zero button, wire FI, and — resistance "RES", back contacts of AMI and AMC; but the negative path is not direct, but rather by way of a back contact controlled by MI itself; hence, these two electromagnets will strike or click bell-fashion and the back contact of MI is disposed in such a way that each beat will suffice to cause notching forward by one tooth of wheels RC and RI. Hence, the brush of finder CH and pointer of indicator IND are shifted ahead stepwise and together.

Initially these two mobile elements are positioned upon their zero contact corresponding to the zero point of the system.

At the first beat both of them shift on contact A; as a result at the receiving end electromagnet CBI is rendered operative and releases RBI. The fact that button BI is kept depressed will not produce any results; hence, in order to make a measurement all that is necessary is to briefly push down button BI. At the sending end coupling relay EI is energized by the following circuit: +, zero button, wire FI, brush and contact A of the finder, winding of EI, wire F3, winding of relay AMC and —. The relay EI operates and holds directly on wire FI; it holds at the same time by means of a coupling system (not shown) the pointer AI upon a contact stud opposite which it happens to be placed, say, contact 7. The relay AMC although traversed by the same current as EI is not operated for its sensitiveness is not sufficient, it being designed to respond only when directly connected with negative and positive poles. It will thus be seen that the first beat causes the two mobile elements to pass to contact A, to render button BI inoperative and to cause engagement of the needle AI with its contact 7.

The electromagnets MI and MC continue striking, wheels RI and RC drive simultaneously the mobile elements step by step; but at the ninth beat the brush of the finder reaches contact 7 whereas the pointer of the indicator device will have reached division 7. At this instant electromagnets MC and MI will be short-circuited by wire FI, brush and contact 7 of seeker CH, contact 7 and pointer of AI, wire F2. From this instant electromagnets MI and MC stay stationary, but the source of current is not short-circuited because it is protected by resistance "RES".

Hence, it will be seen that as a result of a depression of button BI there will be repeated telemetrically in indicator device IND the reading given by the needle of the measuring instrument AI.

After such reading the assembly can be restored to the starting point by briefly depressing the zero button and this interrupts the holding of coupling electromagnet EI which is restored to an inoperative position and frees pointer AI. When the zero button is relaxed pointer AI no longer is in frictional engagement with its contact and there is no longer a state of short-circuit in MC and MI. Indeed, these two electromagnets resume their movement, the wheels and mobile elements continue rotating. However, as wheel RC has 13 teeth whereas wheel RI has 15 teeth whence the result that brush of CH reaches its contact O prior to a time that the needle of IND reaches its zero position.

When the brush of CH reaches contact O relay AMC is indirectly energized by wire F3 and operates, it cuts wire F2 and stops the action of MC, hence the finder stops at the zero position. During this time, a pointer of IND continues its movement and when it reaches contact O, relay AMI is operated in turn and circuit of MI is broken whence immobilization of indicator IND upon its zero position.

It will be noted that the circuit of AMI passes through a working contact of AMC, whence it follows that it is imperatively necessary that CH should be in the zero position when IND stops at zero. What is thus insured is a sort of synchronism mark, insuring starting at the same point regardless of what may be the position of the mobile elements at the instant when current is energized and regardless of what may happen in the course of operation.

The transmitter and receiver being at zero, relays AMI and AMC are energized and electromagnets MI and MC remain at rest. To make a new measurement or reading it is sufficient to depress again for a very short while button BI or B2 in order to energize relay RBI which causes locking of AMI and AMC and starting of the system.

Button B2 controls remote reading of indications obtained by the measuring device A2.

With the device being in a zero position, if then button B2 be depressed, relays RBI and RB2 are energized simultaneously and relay RB2 is held breaking the negative return of AMC, MI and MC are set in motion as hereinbefore described; but when the brush of CH passes on contact A relay EL is not energized because it does not find the negative by way of wire F3 across AMC, the latter being isolated from the negative by RB2 in operation. Hence, the change on contact A will be without effect.

However, upon the second beat when mobile elements attain their contact B, relay CB2 is energized, it breaks the circuit of RB2 which comes to rest; at this instant electromagnet E2 is energized by way of the following circuit: positive pole, zero button, wire FI, brush, contact B of CH, coil of E2, wire F3, coil of AMC and negative pole. The electromagnet E2 when energized will cause pointer A2 to engage its contact and thus it will be reading of the second instrument that will be telemetrically repeated by the indicator.

The foregoing description is merely by way of example; the elements hereinbefore described may be used whole or in part, together or separately, according to actual requirements; there could also be changed a number of contacts in the measuring instruments, the finder and indicator device may be varied in accordance with any degree of accuracy and the range of measurements that are desired, and the number of ratchet teeth will have to be chosen accordingly, though wheel RI should always have a greater number of teeth than wheel RC.

The number of measuring instruments which are to be read telemetrically is not restricted to two, indeed, it may be increased at will, and all that is necessary to that end is to add to the system for each of the supplementary measuring instruments a finder contact, an indicator contact, a control button and a set of relays RB—CB.

What I claim and desire to secure by Letters Patent of the United States is:

1. In an apparatus for the transmission of indications to a distance, the combination composed of one part comprising at least one pointer measuring instrument whose reading is thereby transmitted to a remote control, an electro-magnet associated with said pointer and a finder device having an electro-magnet operable through a cycle of a predetermined number of contact steps, and of another part arranged at the point of observation and comprising an indicator for the reading of the instrument and operable through a cycle of a number of steps greater than that of the finder, three electrically conductive connections operatively connecting the two parts, contact means operable to establish by these connections an electrical circuit connecting said indicator and said finder to produce a discontinuous movement simultaneously step by step of the said indicator and finder under the action of electrical impulses transmitted to the electromagnet located at the point of observation, a series of electrical contacts arranged in a plane parallel to that swept by the pointer of the measuring apparatus, contact means operable to move the pointer perpendicularly to its plane to make electrical contact with that one of the series of contacts aligned with the pointer, ratchet means operable to control this movement including an electric circuit passing through two of the said conductive connections and a relay arranged at the point of observation and contact means operable to cause the indicator to reproduce the position of the pointer of the instrument resting against the contact by means of a circuit passing through the said pointer, the said contact, two of the said electrical conductive connections and the indicating device.

2. In an apparatus for the transmission of indications to a distance, the combination composed of a part comprising at least one pointer measuring instrument and a finder device, and of another part arranged at the point of observation and comprising an indicator for the reading of the instrument, three electrically conductive connections operatively connecting these two parts in an electrical circuit connected with the said indicator and said finder to produce a discontinuous movement simultaneously step by step of the indicator and finder under the action of electrical impulses transmitted to the point of observation, a series of contacts arranged in a plane parallel to that swept by the pointer of the measuring instrument, a ratchet and an electro-magnet operable to move the pointer perpendicularly to the said plane to make electrical contact with that one of the said contacts which is aligned with the pointer, contact means operable to control this movement by a circuit passing through two of the said electrical conductive connections and through a relay located at the point of observation, contact means operable to cause the indicator to reproduce the position of the pointer resting against the contact by means of a circuit passing through the pointer, the said contact, two of the said conductive connections and the indicating device, contact means comprising relays operable to ensure the stoppage of the indicator and of the finder when the last said circuit becomes closed and contact means operable to reset the apparatus at zero the last said means being controlled by impulses transmitted to the point of observation and ensuring the forward movement of the indicator and of the finder in the same direction as during the measurement up to the normal position of rest of the said indicator and finder.

3. Apparatus for the transmission of indications over a distance composed of a measuring station or point comprising at least one needle-type measuring instrument furnished with studs, and an arm or wiper sliding over the said studs, and fixed upon a rotary spindle, and an observation point comprising a source of electrical current and an indicator of the result of the measurement comprising a plurality of studs and a wiper sliding over said studs and fixed upon a rotary spindle, three electrically conductive connections uniting these two stations, one of these connections interconnecting the spindles of the said seeker and indicator, means for supplying in parallel these spindles from the said source through this last-named connection, ratchet means to insure a simultaneous discontinuous movement of the wipers of the indicator and the seeker under the action of an impulse sent to the observation point or station, these ratchet means being controlled by magnets fed in parallel from the said source of current, a self-interrupter device for one of the magnets being provided to cut the supply periodically, connections forming, in a prearranged position of the said wipers, an electrical circuit comprising the source of current, the wiper and one stud of the indicator, the wiper and one stud of the seeker, and the needle and one stud of a measuring instrument, contact means between the needle and this latter stud to repeat by the indicator the position of the said needle.

4. Apparatus for the transmission of indications over a distance composed of a measuring station or point comprising at least a measuring instrument of the needle-type and furnished with a plurality of studs, and a seeker device composed of a plurality of studs and a wiper sliding over said studs and fixed on a rotary spindle, and an observation point comprising a source of electrical current and an indicator of results of measurements composed of studs and a wiper sliding over these studs and fixed on a rotary spindle, the seeker and the indicator comprising each studs corresponding to the studs of the measuring apparatus and a supplementary stud for each measuring instrument, the studs of the seeker corresponding to the studs of the measuring instrument being electrically united with these latter, magnetic means for establishing contact between the needle and a stud of each measuring instrument, and connections between these latter means and the respective supplementary studs of the seeker, three electrically conductive connections uniting these two points, one of these connections interconnecting the spindles of the said seeker and indicator, circuit means for feeding in parallel these spindles by the said source through this latter connection, contact means for insuring a discontinuous movement simultaneously of the wipers of the indicator and the seeker under the action of an impulse sent to the observation point, connections forming, in a predetermined position of the said wipers, an electrical circuit comprising the source of current, the wiper and a stud of the indicator, the wiper and a stud of the seeker, and the needle and a stud of a measuring instrument and means comprising the said contact means between the needle and this latter stud to repeat by the indicator the position of the said needle.

5. Apparatus for the transmission of indications over a distance composed of a measuring station or point comprising at least a needle-type measuring instrument furnished with a plurality of studs, and a seeker device composed of a plurality of studs and a wiper sliding over said studs and fixed upon a rotary wiper, and an observation station comprising a source of current and an indicator of the result of the measurement composed of a plurality of studs and a wiper sliding over said studs and fixed upon a rotary spindle, three electrically conductive connections uniting these two stations, one of these connections interconnecting the spindles of the said seeker and indicator, means for feeding in parallel these spindles from the said source through this latter connection, contact means for insuring a simultaneous discontinuous movement of the wipers of the indicator and of the seeker under the action of an electrical impulse passed to the observation station, said contact means being driven by magnets fed in parallel by the said source of current, an interrupter of one of the magnets being provided to periodically interrupt the feed, a device corresponding to each measuring apparatus and comprising a system of relays being disposed to render operative the said self-interrupter by a single impulse sent by means of this device, connections forming, in a predetermined position of the said wipers, a circuit comprising the source of current, the wiper, and a stud of the indicator, the wiper and a stud of the seeker, the needle and a stud of a measuring instrument, and contact means between the needle and this latter stud to regulate by the indicator the position of the said needle.

6. Apparatus for the transmission of indications over a distance composed of a measuring station or point comprising at least a needle-type measuring instrument with a plurality of studs, and a seeker device composed of a plurality of studs and a wiper sliding over these studs and fixed upon a rotary spindle, and an observation station comprising a source of electrical current and an indicator of the results of measurements composed of studs and a wiper sliding over these studs and fixed upon a rotary spindle, three electrically conductive connections uniting these two stations, one of these connections interconnecting the spindles of the said seeker and indicator, contact means for feeding in parallel these spindles by the said source through this latter connection, means for insuring a simultaneously discontinuous movement of the wipers of the indicator and the seeker under the action of an impulse sent to the observation station, contact means being driven by magnets fed in parallel by the said source of current, a self-interrupter device for one of the magnets being provided to periodically interrupt the magnetization, connections forming, in a predetermined position of the said wipers, a circuit comprising the source of current, the wiper and a stud of the indicator, the wiper and a stud of the seeker and the needle and a stud of a measuring instrument, contact means between the needle and the latter stud for repeating by the indicator the position of the said needle, and connections short-circuiting the said magnets of control of the indicator and the seeker when the wiper of the latter has reached the position wherein the before-mentioned circuit is closed.

7. Apparatus for the transmission of indications over a distance comprising a measuring station consisting of at least one needle-type measuring device having electrical contacting studs, contacting means comprising relays for making contact between the needle and a stud, a seeker comprising a first series of contacting studs connected respectively with relays corresponding to each measuring device, a second series of contacting studs connected respectively with successive studs of all measuring devices and a sliding electrical arm sliding over said studs and mounted upon a rotary spindle, means to insure a discontinuous movement of the said spindle controlled by a driving magnet, an observation station comprising a source of electrical current and a result indicator of the measurement consisting of a first series of studs connected respectively with controlling relays, a second series of insulated studs and a contacting arm sliding over said studs and fixed on a rotary spindle, means to insure a discontinuous movement of the said last spindle controlled by a second driving magnet, an electrical connection interconnecting the spindles of said seeker and said indicator, a second electrical connection between both said driving magnets, and a third electrical connection between the first stud of the seeker and a controlling relay, means to break by the said controlling relays the said second connection, controlled connections between a pole of the said source and the first connection and between the other pole of the source and the second connection, a connection between the needles of the measuring devices and the second connection, a connection between the said contacting relays and the third connection, and connections between the said driving magnets and the first connection.

8. Apparatus for the transmission of indications over a distance comprising a measuring equipment consisting of a measuring device having electrical contact studs, contacting means comprising relays for making contact between the measuring equipment and the studs, a seeker device comprising a plurality of contact studs and a sliding arm for making contacts to said studs, a rotary spindle on said seeker device, an observation point comprising a source of electrical current and a result-indicator of the measurement having a plurality of studs and an arm sliding over said studs and fixed on the rotary spindle, the seeker and the indicator each comprising a like number of studs corresponding to the studs of the measuring device and also an additional stud for each measuring instrument, three electrically conductive connections uniting the said measuring device and said sliding arm, one of said connections interconnecting the spindle of said seeker and indicator contact means for supplying in parallel said spindles by means of an electrical circuit, a parallel arrangement to insure a discontinuous movement simultaneously of the sliding arms of the indicator and of the seeker under the action of an impulse sent to the observation point, electrical connections forming, in a predetermined position of the said sliding arm, an electrical circuit comprising a source of current of said indicator, the sliding arm and one stud of said seeker and indicator, the sliding arm and one stud of the seeker, and the needle and one stud of a measuring instrument, and coupling means comprising electrical contact elements between the needle and the stud to repeat by the indicator the position of said needle.

LOUIS LUCIEN EUGÈNE CHAUVEAU.